(12) United States Patent
Hwang et al.

(10) Patent No.: US 8,237,872 B2
(45) Date of Patent: Aug. 7, 2012

(54) PROJECTION TYPE DISPLAY APPARATUS

(75) Inventors: Sung Ho Hwang, Suwon-si (KR); Jee Hoon Sung, Suwon-si (KR); Pil Yong Oh, Suwon-si (KR); Jun Seok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1387 days.

(21) Appl. No.: 11/841,094

(22) Filed: Aug. 20, 2007

(65) Prior Publication Data

US 2008/0079853 A1    Apr. 3, 2008

(30) Foreign Application Priority Data

Sep. 29, 2006   (KR) .................. 10-2006-0095773

(51) Int. Cl.
*H04N 9/12*    (2006.01)
*H04N 9/31*    (2006.01)

(52) U.S. Cl. .......... 348/743; 348/744; 348/742; 353/84; 359/234

(58) Field of Classification Search .................. 348/743, 348/744, 742, 806, 807, 745; 353/84, 119; 359/234, 892, 891; 362/293
See application file for complete search history.

(56) References Cited

FOREIGN PATENT DOCUMENTS

| JP | 2000-338426 A | 12/2000 |
|----|---------------|---------|
| JP | 2001-296608   | * 10/2001 |
| JP | 2001-296608 A | 10/2001 |
| JP | 2006-047373 A | 2/2006 |

OTHER PUBLICATIONS

Chinese Office Action dated May 11, 2010, in counterpart Chinese Application No. 200710145835.6.

* cited by examiner

*Primary Examiner* — Jefferey Harold
*Assistant Examiner* — Jean W Desir
(74) *Attorney, Agent, or Firm* — Sughrue Mion, PLLC (57) ABSTRACT

A projection type display apparatus is capable of significantly reducing operational noise of a color wheel. The projection type display apparatus includes a color wheel, a color wheel assembly in which the color wheel is installed, and a noise damping section which changes air flow caused by a rotation of the color wheel so as to reduce the noise.

11 Claims, 12 Drawing Sheets

PROJECTION TYPE DISPLAY APPARATUS

CROSS-REFERENCE TO RELATED APPLICATION

This application claims the benefit of Korean Patent Application No. 2006-95773 filed on Sep. 29, 2006, in the Korean Intellectual Property Office, the disclosure of which is incorporated herein by reference.

BACKGROUND OF THE INVENTION

1. Field of the Invention

The present invention relates to a projection type display apparatus, and more particularly, to a projection type display apparatus capable of changing flow of air generated when a color wheel filtering light projected from a light source rotates, thereby reducing noise.

2. Description of the Prior Art

In general, a projection type display apparatus adopts a principle that an image is projected on a screen by means of a mirror and an optical lens. Such a projection type display apparatus includes a projector or a projection television.

In particular, the projection television is an apparatus which realizes a large scale screen using the above principle, and is classified into a CRT (Cathode Ray Tube) projection television, an LCD (Liquid Crystal Display) projection television, and a DLP (Digital Light Processing) projection television according to a display device thereof that displays signal-processed image information.

The projection television includes a light source emitting white light and a color wheel which is provided adjacent to the light source so as to allow red R, green G and blue B light components of the white light to selectively pass through the color wheel.

Since the color wheel is a rotating member in which a color rotation plate is rotated by means of a driving source at a high speed of 9000 RPM or above, noise occurs due to the rotation of the color wheel.

Figure 1:
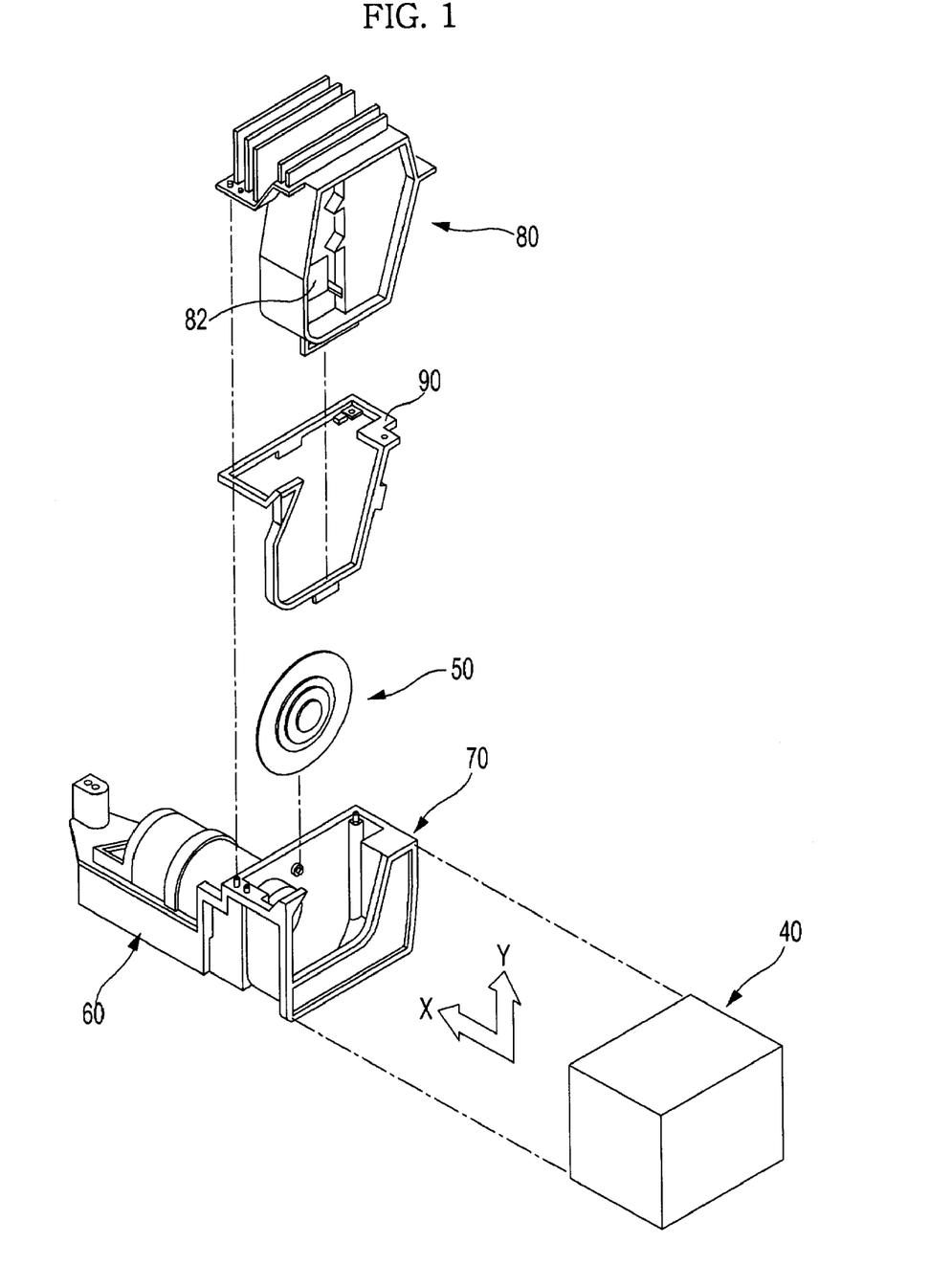
FIG. 1 is an exploded perspective view representing a color wheel and a color wheel assembly according to a related art.

As shown in FIG. 1, the color wheel 50 is housed in a color wheel housing 70, and an upper portion and one side portion of the color wheel housing 70 are opened. The opened portions of the color wheel housing 70 can be closed by a color wheel holder 80. In addition, a sealing member 90 made from rubber is interposed between the color wheel housing 70 and the color wheel holder 80 so as to prevent noise and vibration caused by an operation of the color wheel 50.

Meanwhile, a light source 40 is provided at one side of the color wheel housing 70 so as to irradiate light and a UV filter 82 filtering UV components of light projected from the light source 40 is installed on the color wheel holder 80.

In addition, the color wheel housing 70 is provided with an optical tunnel 60 through which light filtered by the color wheel 50 passes. In addition, a panel section (not shown) and a projection lens projecting an image generated from the panel section onto a reflective mirror (not shown) are provided while being spaced apart from the optical tunnel 60 by a predetermined distance.

Here, the panel section has a DMD (Digital Micro-mirror Device) and serves to generate the image based on the light of an optical part by controlling a reflective angle of each pixel.

The light is uniformly distributed via the optical tunnel 60, so that the image is created on the panel section (not shown), and the image is displayed on a display unit (not shown) through a projection lens (not shown) and a reflective mirror (not shown).

However, when the color wheel 50 rotates in the conventional color wheel housing 70, noise and vibration are generated due to the rotation of the color wheel 50. Accordingly, as described above, the sealing member 90 is provided between the color wheel housing 70 and the color wheel holder 80 so as to prevent the noise and the vibration from being mechanically applied to the color wheel housing 70 and the color wheel holder 80.

However, when the color wheel 50 rotates at the high speed, a high-speed air flow occurs in an inner space formed between the color wheel housing 70 and the color wheel holder 80. Due to the characteristics of the air flow and a collision between the air flow and an inner wall of the color wheel housing 70 and the color wheel holder 80, noise and vibration are generated. Such noise and vibration cannot be effectively prevented by using the sealing member 90.

In addition, most of the energy of the high-speed air flow is converted into thermal energy, so that the life span of compartments including the color wheel housing 70 is shortened and reliability of the product is degraded.

In particular, when light irradiated from the light source 40 has passed through the color wheel 50, some of light is utilized and the remaining parts of light are wasted, thereby incurring a transmission loss of light. In this case, it is necessary to enlarge a size of the color wheel 50 or to increase the RPM of the color wheel 50 in order to ensure a sufficient amount of light. However, acoustic noise is significantly increased when the size or the RPM of the color wheel 50 is increased.

SUMMARY OF THE INVENTION

Illustrative, non-limiting exemplary embodiments of the present invention overcome the above disadvantages, as well as other disadvantages not described above.

An apparatus consistent with the present invention provides a projection type display apparatus capable of reducing influence of noise and vibration by changing characteristics of high-speed air flow which is created in a color wheel housing due to rotation of a color wheel.

In order to accomplish the above object, according to an aspect of the present invention, there is provided a projection type display apparatus comprising a color wheel, a color wheel assembly in which the color wheel is housed, and a noise damping section provided in the color wheel assembly so as to reduce noise by changing air flow caused by a rotation of the color wheel.

The color wheel assembly includes a color wheel housing for accommodating the color wheel and a color wheel holder, which is coupled to the color wheel housing so as to cover the color wheel housing and in which the color wheel is rotatably installed.

The noise damping section is provided at an inner surface of the color wheel housing in a concave-convex shape.

The noise damping section is provided at an inner surface of the color wheel holder in a concave-convex shape.

A plurality of noise damping sections are provided at an inner surface of the color wheel assembly while facing a rotation surface of the color wheel, and are spaced apart from each other so as to form an air gap therebetween.

The noise damping sections are provided in a rotation direction of the color wheel, in which the noise damping sections include bars which extend radially outward by a predetermined length from a portion corresponding to a center of the color wheel.

The noise damping section has a predetermined curvature corresponding to the rotation direction of the color wheel.

The noise damping section includes bars which are spaced apart from each other by a predetermined interval along an inner wall of the color wheel housing while corresponding to a front end of the color wheel.

The noise damping section is partially bent.

The bars are offset from each other.

According to another aspect of the present invention, there is provided a projection type display apparatus comprising a color wheel, a color wheel assembly in which the color wheel is rotatably housed, and a noise damping section having a concave-convex shape, which forms an air gap making contact with high speed air flow in the color wheel assembly so as to reduce an influence of the high speed air flow, which is generated due to a rotation of the color wheel, on the color wheel assembly.

A plurality of noise damping sections are provided, in which the noise damping sections are radially aligned while being spaced apart from each other by a predetermined interval on inner surfaces of a front wall and a rear wall of the color wheel assembly that are located at a front side and a rear side of a rotation surface of the color wheel.

The noise damping sections are spaced apart from each other by a predetermined interval on an inner wall of the color wheel assembly corresponding to a front end of the color wheel, so that an influence of an air flow split at the front end of the color wheel is controlled.

DETAILED DESCRIPTION OF THE EXEMPLARY EMBODIMENTS

Hereinafter, preferred embodiments of the present invention will be explained with reference to the accompanying drawings. A projection type display apparatus includes a projection television and a projector, both of which have the same characteristics in that they display images by projecting light. However, for the purpose of convenience, the projection television will be described below as an example of the projection type display apparatus.

It should be noted that technical features to be described below are also adaptable for the projector.

Figure 2:
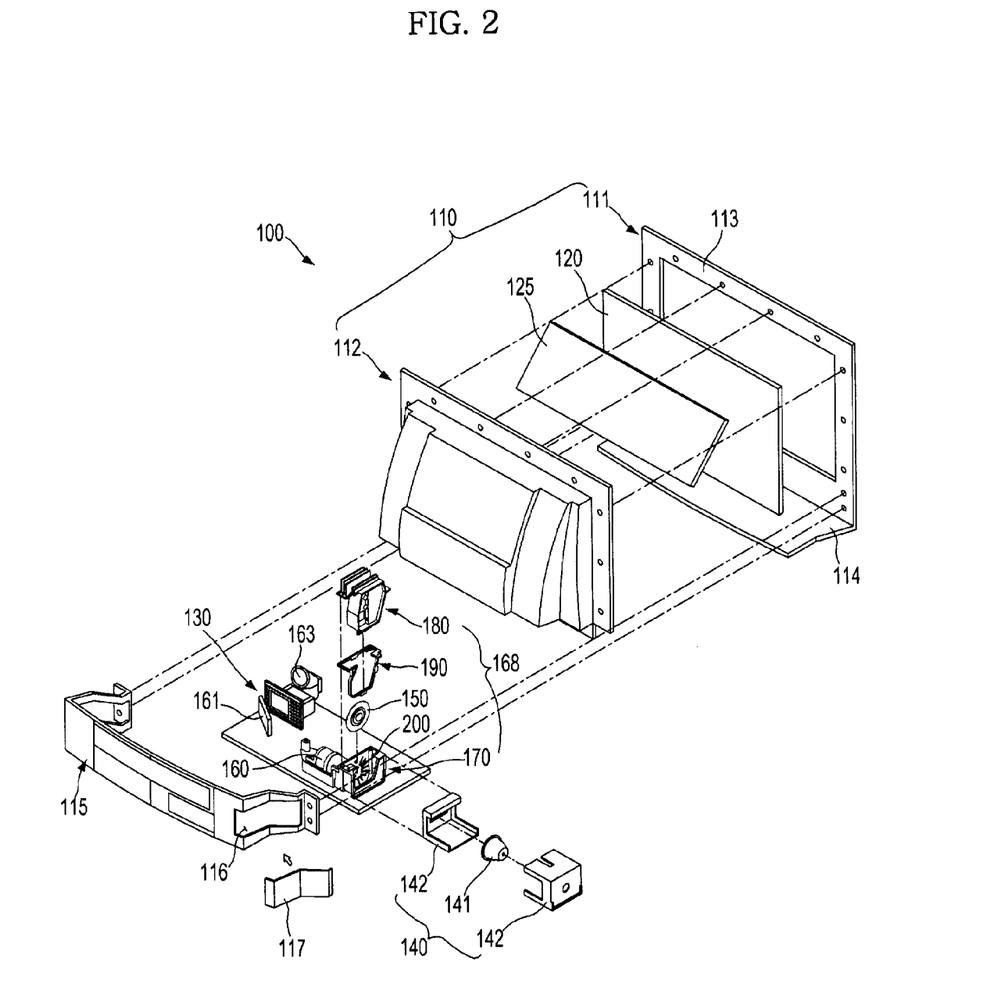
FIG. 2 is an exploded perspective view representing a projection type display apparatus according to the present invention.

As shown in FIG. 2, a projection television 100 according to the present invention includes a casing 110 forming an exterior appearance of the projection television 100, in which the casing 110 includes a front casing 111 and a rear casing 112.

The casing 110 includes a display section 120 on which an image is displayed, a reflective mirror 125 provided at a rear surface of the display section 120, an optical engine unit provided at a lower portion of the display section 120 so as to project the image through the reflective mirror 125 on the display section 120, and a light source 140 provided adjacent to the optical engine unit 130 so as to provide the optical engine unit 130 with light. The light source 140 includes a lamp 141 for irradiating white light and a lamp casing 142 for surrounding the lamp 141.

The front casing 111 includes a front surface frame 113 coupled to the display section 120 and a lower surface frame 114 which extends from the front frame 113 and is bent backward so as to allow the optical engine unit 130 and the light source 140 to be installed thereon.

Meanwhile, the reflective mirror 125 is mounted on an upper portion of the rear casing 112, and a lower cover 115 coupled to the front casing 111 is provided on a lower portion of the rear casing 112. At one side of the lower cover 115, an opening 116 which is opened so as to allow the light source 140 to be inserted/withdrawn and a cover 117 which opens/closes the opening 116 are formed.

The optical engine unit 130 is an assembly of systems for projecting images, and includes a color wheel 150 allowing red R, green G and blue B light components of the light source 140 to be selectively transmitted therethrough, and a color wheel assembly 168 for accommodating the color wheel 150.

Here, the color wheel assembly 168 includes a color wheel housing 170 which has an optical tunnel 160 serving as a moving path for light passing through the color wheel 150 and uniformly distributing the light, and a color wheel holder 180 for covering the color wheel housing 170 while rotatably supporting the color wheel 150. A sealing member 190 is interposed between the color wheel holder 180 and the color wheel housing 170 so as to prevent noise and vibration caused by a rotation of the color wheel 150 from being transferred to an exterior.

Meanwhile, a panel section 161 having a DMD (Digital Micro mirror Device) is installed at one side of the color wheel housing 170 while being spaced apart from the color wheel housing 170 by a predetermined interval so as to generate the image based on the light passing through the optical tunnel 160 by controlling a reflective angle of each pixel. In addition, a projection lens 163 projecting the image generated from the panel section 161 onto the reflective mirror 125 is also provided at one side of the color wheel housing 170.

In addition, a noise damping section 200, which changes a high-speed air flow created by a rotation of the color wheel 150 so as to reduce noise, is provided at an inside of the color wheel assembly 168. A detailed structure of the noise damping section 200 will be described later.

Figure 3:
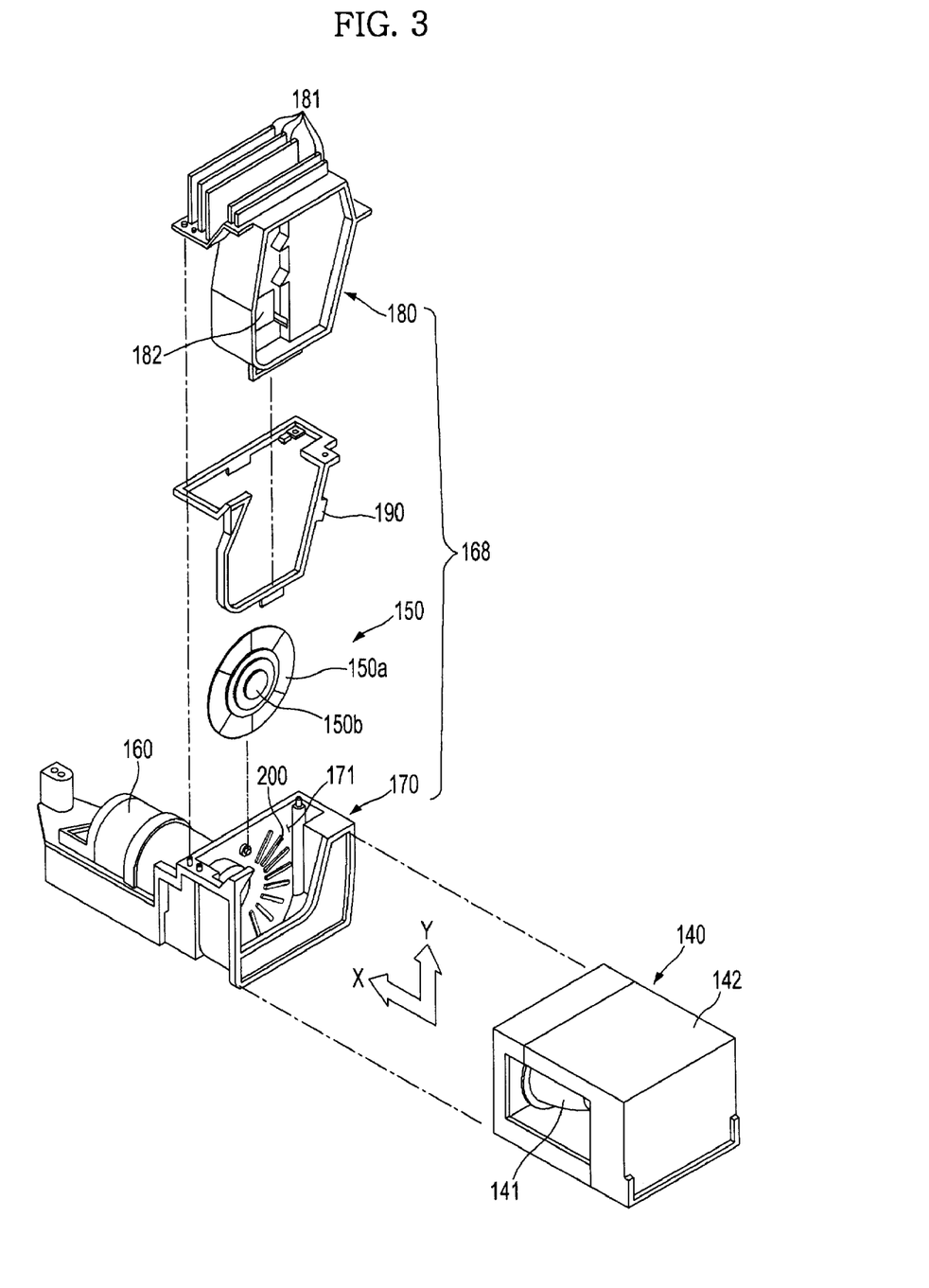
FIG. 3 is an exploded perspective view representing a color wheel and a color wheel assembly according to the present invention.

As shown in FIG. 3, color filters 150a are sequentially aligned on the color wheel 150 and a driving source 150b driving the color wheel 150 is provided at the center of the color wheel 150

Meanwhile, a color wheel casing 171, in which the color wheel 150 is housed, is provided at an inside of the color wheel housing 170, and the noise damping section 200, which controls the high-speed air flow created by the rotation of the color wheel 150 so as to reduce noise, is provided on an inner wall of the color wheel housing 170 forming the color wheel casing 171.

Here, the noise damping section 200 is prepared in the form of bars which extend radially outward from the center portion of the inner wall of the color wheel housing 170.

Meanwhile, the sealing member 190 for reducing vibration and noise is provided at an upper portion of the color wheel housing 170 while corresponding to an upper edge shape of the color wheel housing 170, and a color wheel holder 180 is provided on the sealing member 190.

The color wheel holder 180 includes zinc or aluminum so as to emit heat, generated due to the rotation of the color wheel 150, to the exterior of the color wheel housing. In order to improve the heat transfer efficiency, heat sinks 181 are provided on an upper portion of the color wheel holder 180.

In addition, a UV filter 182 for filtering UV from light irradiated from the lamp 141 of the light source 140 is installed at one side of the color wheel holder 180.

Meanwhile, an optical tunnel 160 for uniformly distributing the light filtered through the color wheel 150 is provided at one side of the color wheel housing 170, and, as described above, the light passing through the optical tunnel 160 is introduced into the panel section 162 (see, FIG. 2).

Figure 4:
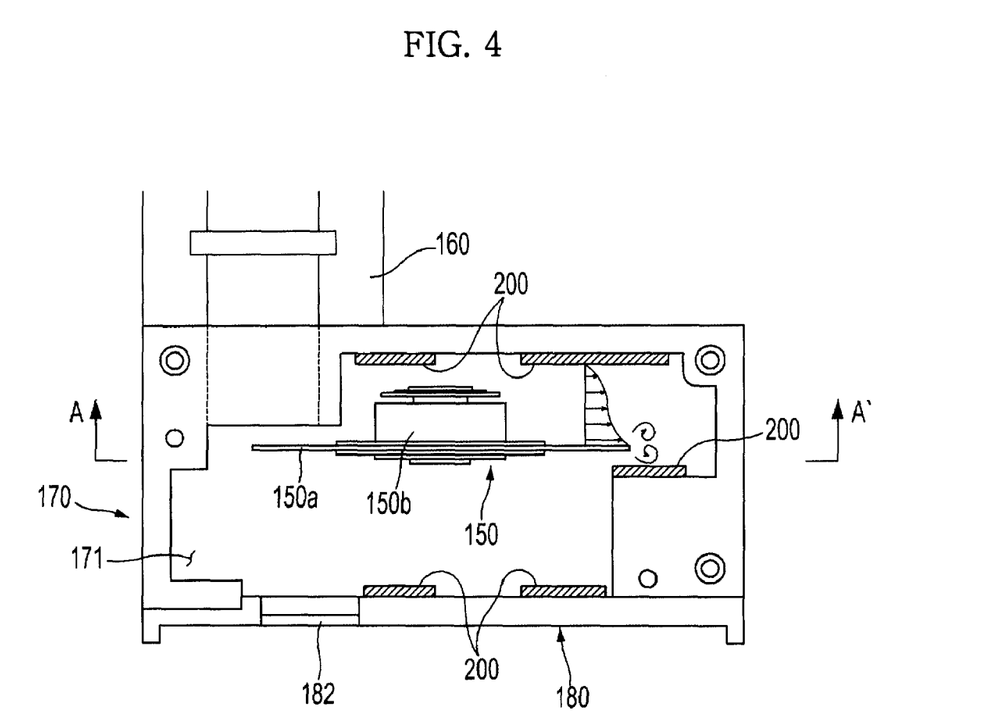
FIG. 4 is a plan-sectional view representing a color wheel assembly according to a first exemplary embodiment of the present invention.

Referring to FIG. 4 which is a plan-sectional view representing the color wheel 150 accommodated in an assembly of the color wheel housing 170 and the color wheel holder 180, the noise damping section 200 is prepared in the form of protrusions protruding from both inner surfaces of the color wheel housing 170 and the color wheel holder 180.

In particular, according to the present embodiment, the noise damping section 200 is formed while being spaced apart from a front surface and a rear surface of the color wheel 150, wherein the front surface corresponds to a surface of the color wheel 150 that faces the optical tunnel 160, and the rear surface corresponds to a surface of the color wheel 150 that faces the light source. This is to change characteristics of air flow formed among a rotation surface of the color wheel 150, the color wheel housing 170, and the color wheel holder 180.

Here, the noise damping section 200 can be integrally formed with the color wheel housing 170 and the color wheel holder 180, or a sound absorption member, which is prepared separately from the color wheel housing 170 and the color wheel holder 180, can be attached to the color wheel housing 170 or the color wheel holder 180 as the noise damping section 200.

Figure 5:
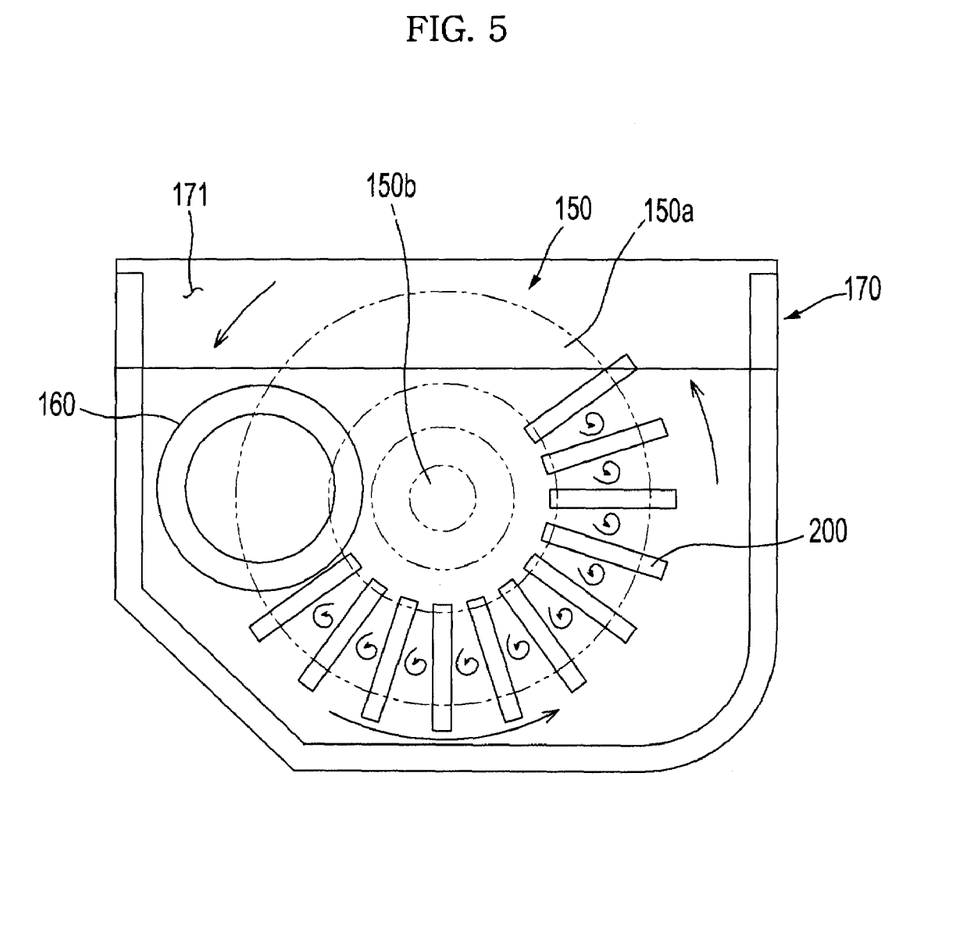
FIG. 5 is a front-sectional view taken along line A-A' shown in FIG. 4.

FIG. 5 is a front sectional view taken along line A-A' of FIG. 4. The noise damping sections 200 radially extend outward from the center portion of the color wheel 150, and the interval between the noise damping sections 200 gradually increases from the center portion to the outer portion of the color wheel 150, as viewed along this sectional line.

Figure 6:
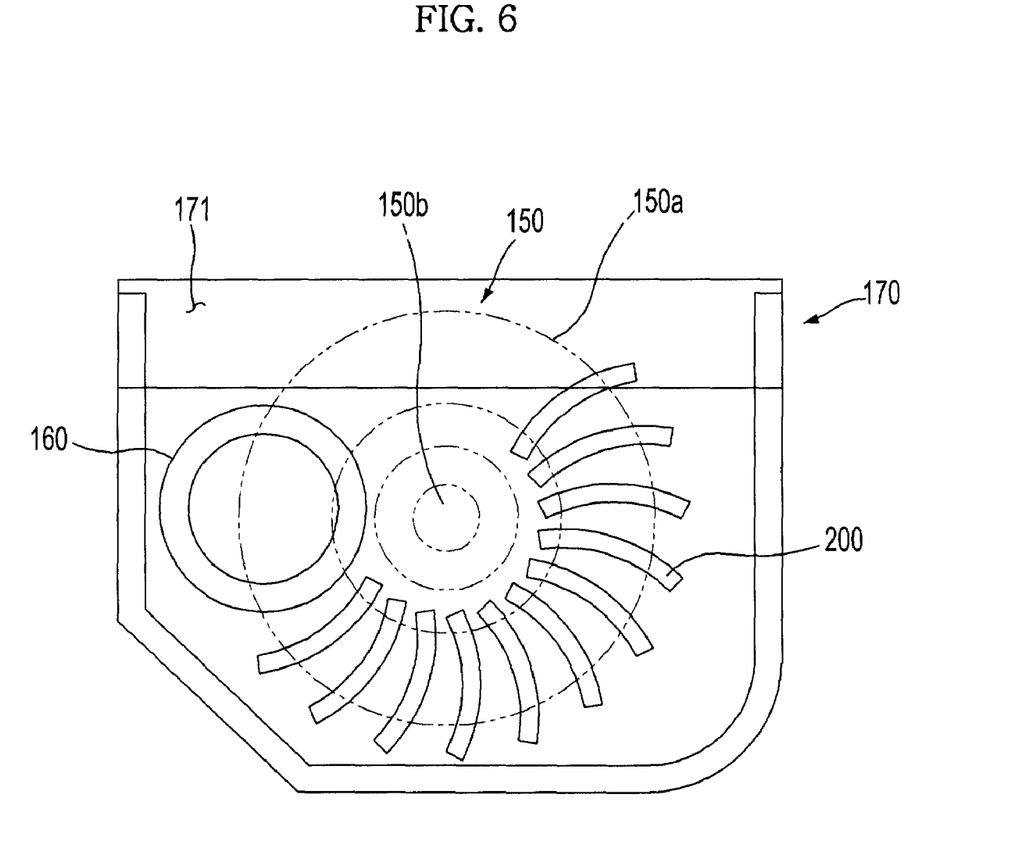
FIG. 6 is a front-sectional view representing a color wheel assembly according to a second exemplary embodiment of the present invention.

FIG. 6 represents another exemplary embodiment which is modified from the first exemplary embodiment shown in FIG. 5. Different from the exemplary embodiment shown in FIG. 5 in which the noise damping section 200 is prepared in the form of bars extending from the center portion to the outer portion of the color wheel 150, the noise damping section 200 according to the present embodiment is prepared in the form of arcs having a predetermined curvature.

Here, a direction of the arc of the noise damping section 200 corresponds to a rotation direction of the color wheel 150 in such a manner that variation of the air flow caused by the rotation of the color wheel 150 can be increased.

Figure 7:
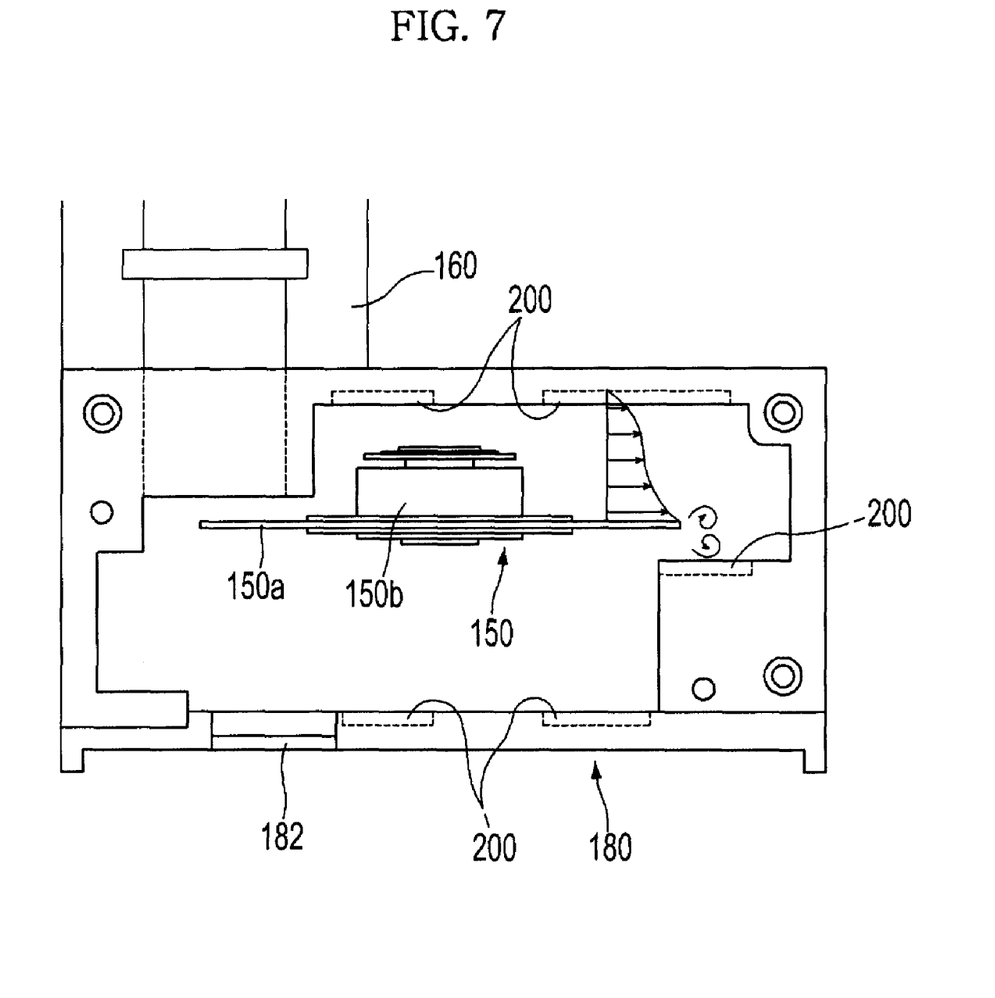
FIG. 7 is a plan-sectional view representing a color wheel assembly according to a third exemplary embodiment of the present invention.

FIG. 7 represents another exemplary embodiment which is modified from the embodiment shown in FIG. 4. Different from the embodiment shown in FIG. 4 in which the noise damping section 200 is prepared in the form of protrusions, the noise damping section 200 according to the present embodiment is prepared in the form of recesses provided on the inner wall of the color wheel housing 170, and the color wheel holder 180.

The noise damping section 200 having the above structure function similarly to dimples formed on a golf ball. That is, air passing through the noise damping section 200 serves as an air cushion so as to offset force generated due to air resistance occurring when the color wheel 150 rotates, so that the air resistance due to the high speed-rotation of the color wheel 150 can be reduced, thereby reducing vibration and noise.

Figure 8:
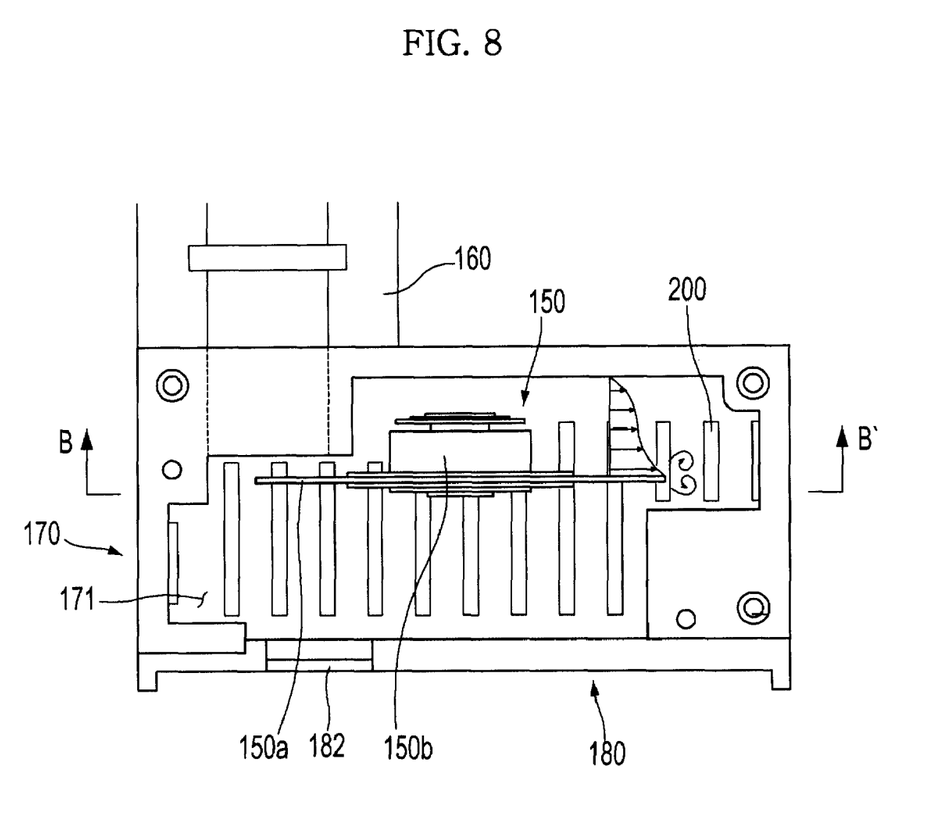
FIG. 8 is a plan-sectional view representing a color wheel assembly according to a fourth exemplary embodiment of the present invention.
Figure 9:
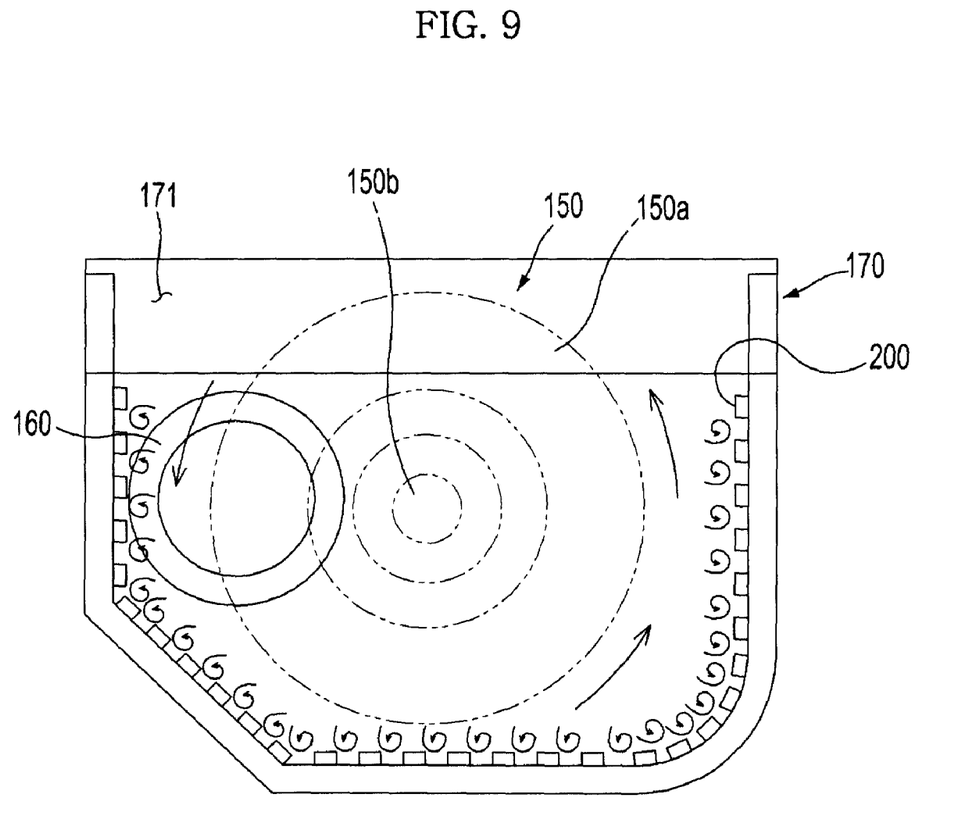
FIG. 9 is a front-sectional view representing a color wheel assembly according to a fourth exemplary embodiment of the present invention.

FIGS. 8 and 9 represent a fourth exemplary embodiment in which the noise damping sections are provided corresponding to a front end of the color wheel 150. This present embodiment is different from the above embodiment in which the noise damping sections 200 are provided on the inner walls of the color wheel housing 170 and color wheel holder 180 so as to correspond to the front surface and the rear surface of the color wheel 150, respectively.

Here, the noise damping sections 200 are provided at inner surfaces of both side walls of the color wheel housing 170 and at an inner surface of the bottom of the color wheel housing 170 so as to correspond to the front end of the color wheel 150.

The reason for forming the noise damping sections 200 corresponding to the front end of the color wheel 150 is to reduce an influence of the high-speed turbulent air flow occurring at the front end of the color wheel 150.

When the color wheel 150 rotates at a high speed, a speed gradient exists between the rotation surface of the color wheel 150 and the inner wall of the color wheel housing 170, so that a separation phenomenon occurs at the front end of the color wheel 150.

Accordingly, a high-speed turbulent air flow occurs at the front end of the color wheel 150 and such turbulent air flow collides with the inner wall of the color wheel housing 170, causing noise and vibration. In order to solve this problem, according to the present embodiment, the noise damping section 200 is spaced apart from the front end of the color wheel 150, so that air gaps formed between the noise damping sections 200 are mixed with the turbulent air flow which is separated, or split, at the front end of the color wheel 150 while serving as air cushions, thereby reducing noise and vibration.

The noise damping sections 200 can be integrally formed with the color wheel housing 170 in the form of protrusions protruding from the inner wall and the inner surface of the bottom of the color wheel housing 170 or can be prepared as a separate sound absorption member.

Figure 10:
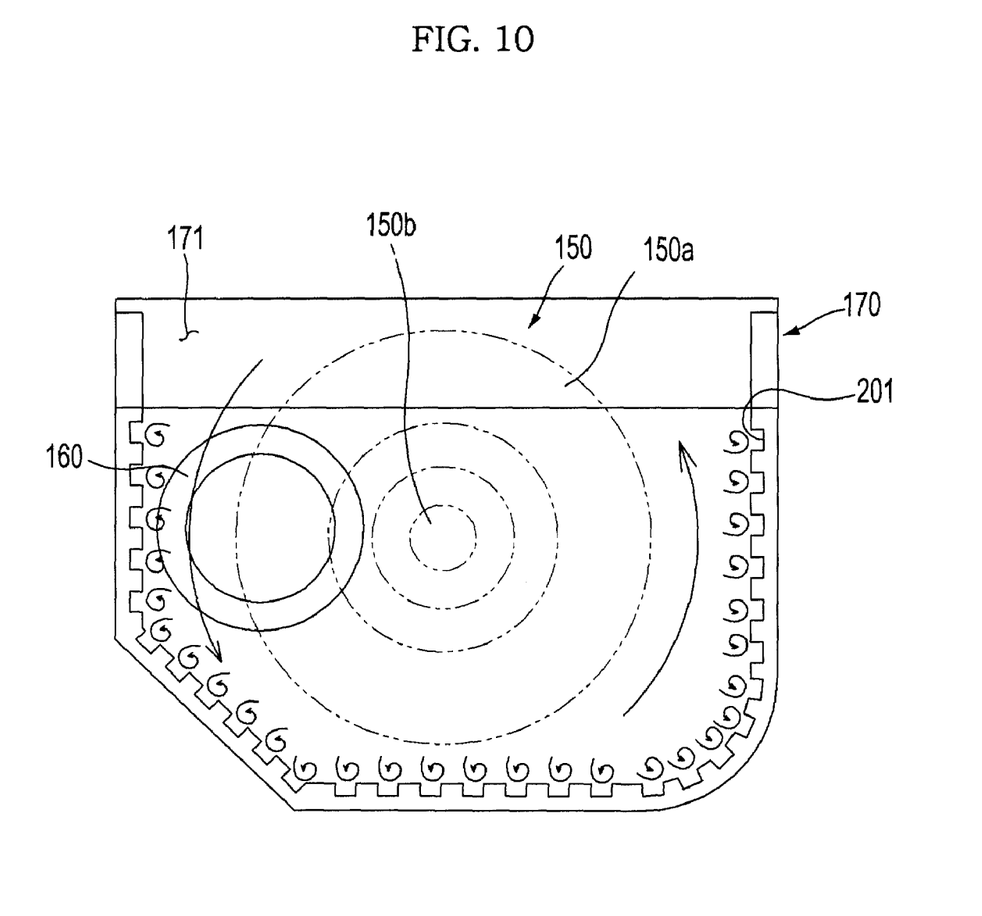
FIG. 10 is a front-sectional view representing a color wheel assembly according to a fifth exemplary embodiment of the present invention.

FIG. 10 represents a fifth exemplary embodiment of the present invention in which a noise damping section 201 prepared in the form of recesses, rather than the protrusions, is provided at the inner surface of the bottom and the inner wall of the color wheel housing 170.

Figure 11:
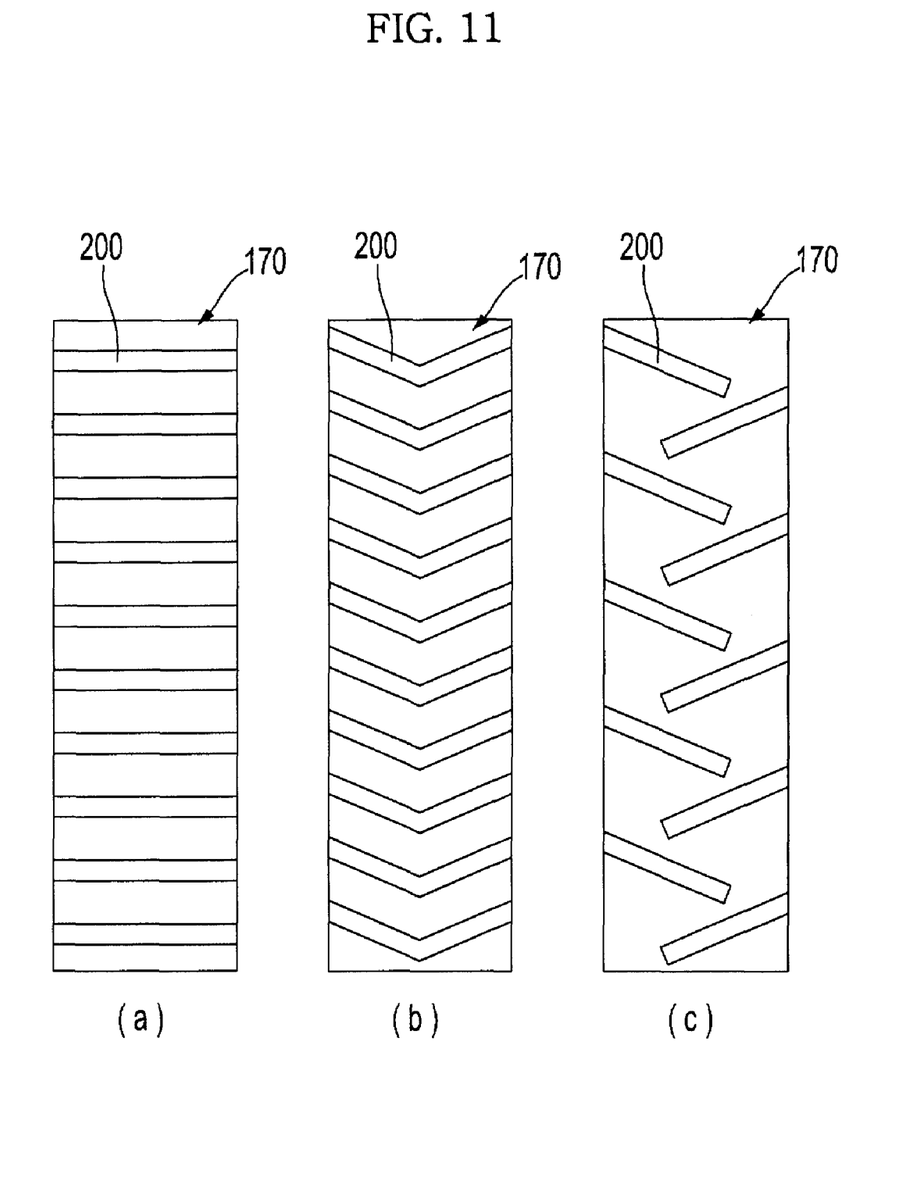
FIG. 11 is a front view representing various alignments of noise damping sections according to the present invention.

FIG. 11 shows the structure of the noise damping sections 200 prepared in the form of protrusions or recesses which are aligned at the side surface and the bottom surface of the color wheel housing 170 as described above with respect to the fourth and fifth embodiments. FIG. 11 (a) shows an alignment pattern in which the noise damping sections are linearly aligned, FIG. 11 (b) shows an alignment pattern in which the center portions of the noise damping sections are bent, and FIG. 11 (c) shows an alignment pattern in which the noise damping sections are offset from each other.

Here, the alignment patterns shown in FIGS. 11 (b) and 11 (c) are oriented in a predetermined direction which corresponds to the rotational direction of the color wheel 150.

Hereinafter, an operation of the projection type display apparatus according to the present invention will be explained with reference to the accompanying drawings.

Figure 12:
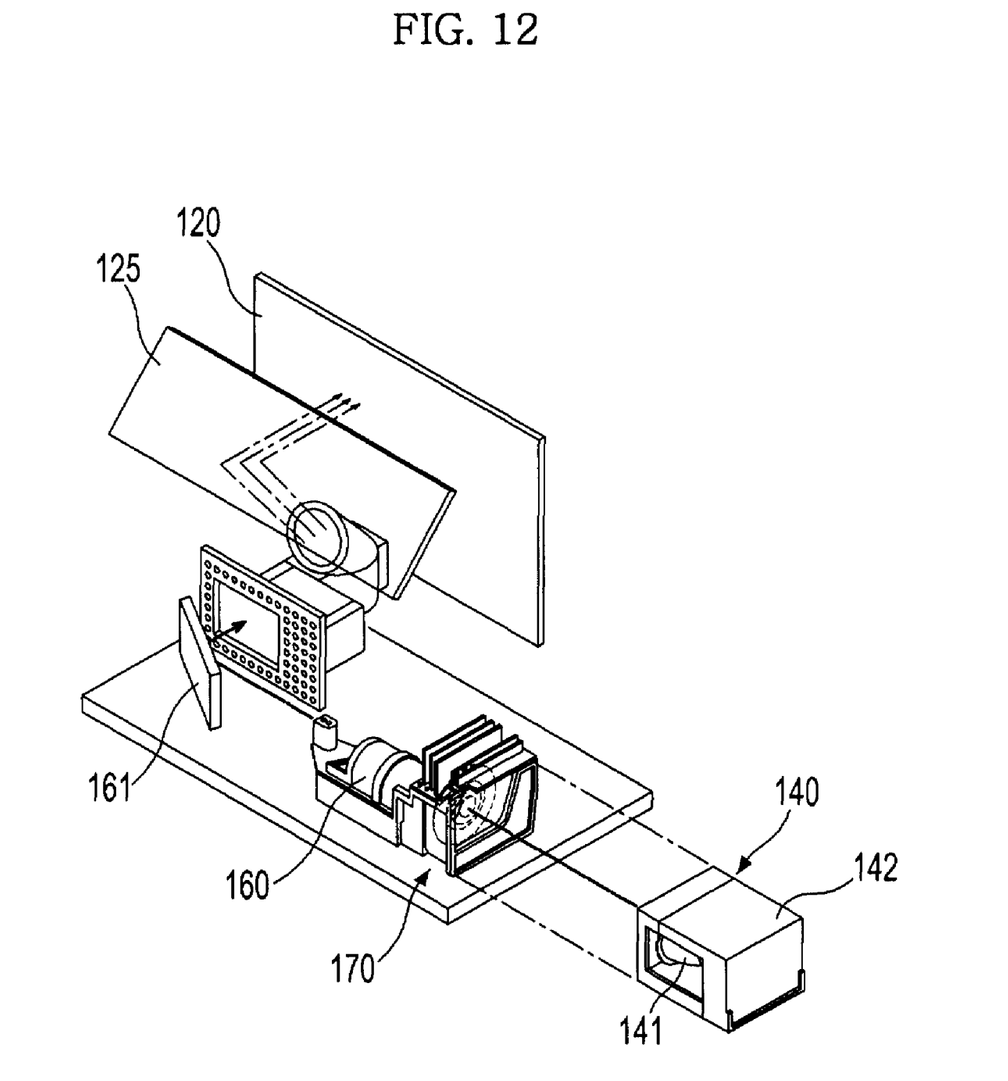
FIG. 12 is a perspective view representing an operational state of an optical engine unit according the present invention.

As shown in FIG. 12, light emitted from the lamp 141 of the light source 140 is irradiated into the color wheel housing 170 and the color wheel holder 180, and then is filtered by the color wheel 150 so as to be changed into red, green and blue light.

The light having a predetermined color via the color wheel 150 is uniformly distributed while passing through the optical tunnel 160, and then is transmitted to the panel section 161.

After that, the light via the panel section 161 passes through a reflective mirror (not shown) and the projection lens 163 including a plurality of lenses (not shown) that determine the focus and magnification degrees of the image, and then is reflected from the reflective mirror 125 so as to be displayed on the display section 120.

Here, as described above, the panel section 161 is provided with a DMD (Digital Micro-mirror Device) so as to generate the image based on the light incident from the optical tunnel 160 by controlling the reflective angle of each pixel.

As shown in FIG. 4, the speed gradient exists between the rotation surface of the color wheel 150 and the inner wall of the color wheel housing 170, and the separation phenomenon causing the air flow to be separated from the color wheel 150 may occur at the front end of the color wheel 150.

In this case, the high-speed turbulent air flow is caused by the speed gradient and the separation phenomenon. However, the influence of the high-speed turbulent air flow is reduced due to the noise damping section 200, so that noise and vibration can be reduced.

As shown in FIG. 5, when the color wheel 150 rotates in the counterclockwise direction, the high-speed air flow is formed in the counterclockwise direction along the rotation direction of the color wheel 150.

At this time, the air gaps formed between the noise damping sections 200 serve as the air cushions which weaken an intensity of collision among the high-speed air flow, the color wheel housing 170, and the color wheel holder 180, and are mixed with the high speed-air flow.

Accordingly, vibration-noise energy is changed into flow energy, so that noise and vibration is reduced.

Meanwhile, the mechanism shown in FIGS. 8 and 9 is substantially identical to that shown in FIGS. 4 and 5. However, the mechanism shown in FIGS. 8 and 9 is focused on reducing the influence of turbulent air flow caused by the separation phenomenon occurring at the front end of the color wheel 150 rather than reducing the influence of high-speed-turbulent air flow caused by the speed gradient between the rotation surface of the color wheel 150 and the color wheel housing 170 and between the rotation surface of the color wheel 150 and the color wheel holder 180.

Accordingly, the high-speed turbulent air flow caused by the separation phenomenon at the front end of the color wheel 150 makes contact with the air gaps formed between the noise damping sections 200 provided at the side surface and the bottom surface of the color wheel housing 170. In addition, the air gaps serve as air cushions and are mixed with the high-speed turbulent air flow, thereby reducing noise and vibration.

The technical features of the noise damping section 200 according to the rotation of the color wheel 150 are also adaptable for the projector as well as the projection television. Therefore, the present invention can be applied to the projector, so the projector having the above technical features may be within the scope of the present invention.

As described above, the projection type display apparatus according to the present invention can reduce impact noise and vibration which are caused by the high-speed air flow occurring when the color wheel rotates at a high speed.

In detail, the high-speed air flow has a turbulent characteristic, and the turbulent air flow makes contact with the air gap formed between the noise damping sections, so that the turbulent air flow rarely makes contact with the inner wall of the color wheel housing and the color wheel holder, directly, and resistance of the turbulent air flow can be reduced.

In addition, the air gaps formed between the noise damping sections and the high-speed turbulent air flow are readily mixed, so that impact noise and vibration energy are changed into flow energy. Therefore, the present invention can reduce noise and vibration occurring in the color wheel housing and the color wheel holder as compared with the related art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection type display apparatus comprising:
a color wheel;
a color wheel assembly in which the color wheel is housed; and
a noise damping section provided in the color wheel assembly so as to reduce noise by changing air flow caused by a rotation of the color wheel,
wherein the color wheel assembly includes a color wheel housing and a color wheel holder coupled to each other to accommodate the color wheel therein, and the noise damping section is disposed at an inner surface of the color wheel housing and an inner surface of the color wheel holder so as to face a front surface and a rear surface of the color wheel, respectively.

2. The projection type display apparatus as claimed in claim 1, wherein the noise damping section provided at the inner surface of the color wheel housing has a concave-convex shape.

3. The projection type display apparatus as claimed in claim 1, wherein the noise damping section provided at the inner surface of the color wheel holder has a concave-convex shape.

4. The projection type display apparatus as claimed in claim 1, wherein a plurality of noise damping sections are provided and said plurality of noise damping sections are spaced apart from each other so as to form an air gap therebetween.

5. The projection type display apparatus as claimed in claim 4, wherein the noise damping sections are provided in a rotation direction of the color wheel, in which the noise damping sections include bars which extend radially outward by a predetermined length from a portion corresponding a center of the color wheel.

6. The projection type display apparatus as claimed in claim 5, wherein the noise damping section has a predetermined curvature corresponding to the rotation direction of the color wheel.

7. The projection type display apparatus as claimed in claim 1, wherein the noise damping section includes bars which are spaced apart from each other by a predetermined interval along an inner wall of the color wheel housing which corresponds to a front end of the color wheel.

8. The projection type display apparatus as claimed in claim 7, wherein the noise damping section is partially bent.

9. The projection type display apparatus as claimed in claim 7, wherein the bars are offset from each other.

10. A projection type display apparatus comprising:
a color wheel;
a color wheel assembly, including a color wheel housing and a color wheel holder coupled to each other, in which the color wheel is rotatably housed; and
a noise damping section having a concave-convex shape, which forms an air gap making contact with high speed air flow in the color wheel assembly so as to reduce an influence of the high speed air flow, which is generated due to a rotation of the color wheel, on a side surface of the color wheel housing that faces a peripheral edge of the color wheel.

11. The projection type display apparatus as claimed in claim 10, wherein a plurality of noise damping sections are provided on the side wall of the color wheel housing, and the noise damping sections are linearly aligned while being spaced apart from each other by a predetermined interval on the side wall.

* * * * *